US012239856B2

(12) United States Patent
Cisneros

(10) Patent No.: US 12,239,856 B2
(45) Date of Patent: Mar. 4, 2025

(54) QUICK FIT FACE RESPIRATOR MASK

(71) Applicant: Christopher John Cisneros, Palmdale, CA (US)

(72) Inventor: Christopher John Cisneros, Palmdale, CA (US)

( * ) Notice: Subject to any disclaimer, the term of this patent is extended or adjusted under 35 U.S.C. 154(b) by 885 days.

(21) Appl. No.: 17/352,345

(22) Filed: Jun. 20, 2021

(65) Prior Publication Data

US 2021/0402224 A1 Dec. 30, 2021

Related U.S. Application Data

(60) Provisional application No. 63/043,136, filed on Jun. 24, 2020.

(51) Int. Cl.
*A62B 18/02* (2006.01)
*A62B 18/08* (2006.01)
*A62B 23/02* (2006.01)

(52) U.S. Cl.
CPC ........... *A62B 18/025* (2013.01); *A62B 18/08* (2013.01); *A62B 18/084* (2013.01); *A62B 23/025* (2013.01)

(58) Field of Classification Search
CPC .......... A61M 16/0605; A61M 16/0661; A62B 18/00; A62B 18/02; A62B 18/025; A62B 18/08; A62B 18/084; A62B 23/025; A41D 13/11; A41D 13/1107; A41D 13/1115; A41D 13/113; A41D 13/1146; A41D 13/1161; A41D 13/1169; A41D 13/1176
See application file for complete search history.

(56) References Cited

U.S. PATENT DOCUMENTS

2018/0289988 A1* 10/2018 Gerson .............. A41D 13/1161

* cited by examiner

*Primary Examiner* — Ophelia A Hawthorne
(74) *Attorney, Agent, or Firm* — Pasadena Legal Group; Norman R. Van Treeck

(57) ABSTRACT

A mask comprising a mask frame, a nose mount, a removable filter stand off support arm, a plurality of removable temple support arms, where each temple support arm has an attachment mechanism to easily attach or detach one or more of the temple support arms to or from the mask frame, a filter rim for attaching a filter to the interior, exterior or both the interior and exterior of the mask frame, and a plurality of removable filter clips for attaching the filter to the filter rim.

16 Claims, 8 Drawing Sheets

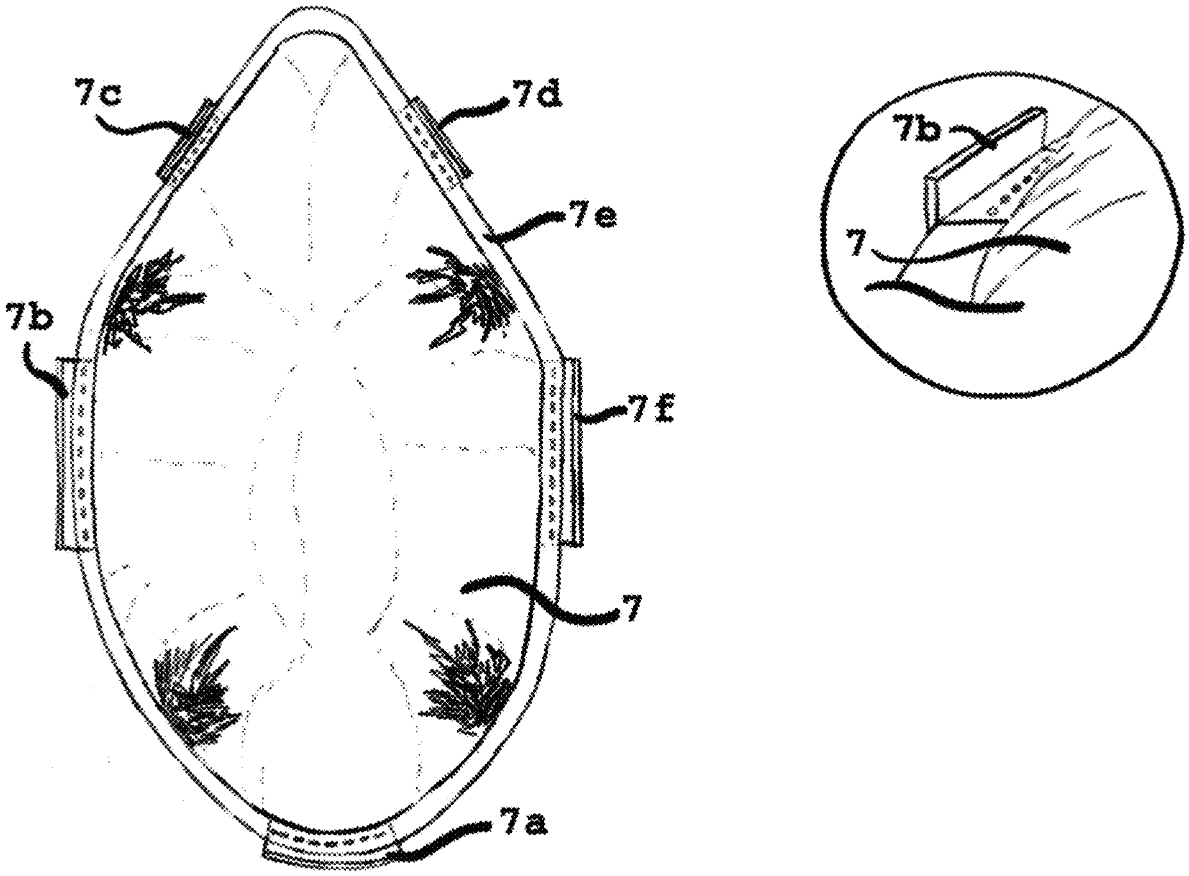
FIG. 700
(Amended)

QUICK FIT FACE RESPIRATOR MASK

CROSS-REFERENCE TO RELATED APPLICATIONS

This Application claims the benefit under 35 U.S.C. § 119(e) of U.S. Provisional Patent Application Ser. No. 61/796, 505, filed on Jun. 24, 2020, the contents of which are incorporated herein by reference in their entirety.

FIELD OF THE INVENTION

The present invention is in the technical field of medical face masks and more particularly to a quick fit half face mask worn by means of two (2) side temple holder arms, that is easy and quick to put on and wear comfortably for extended periods of time.

BACKGROUND

During the Covid-19 pandemic it was strongly encouraged to wear a face covering/mask to help prevent the spread of the virus via spray particles. Essential workers were scrambling to stores to buy any kind of facial mask, surgical mask or N95 type face mask only to find out the store were sold out. Many essential workers were provided single use surgical masks, but because of the mask shortage the essential workers were forced to wear the single use masks for up to 1 week or until another shipment of PPE supplies became available.

Wearing the same surgical mask for extend period bring up several concerning issues. The surgical mask material is to close to the face giving the wearer a suffocating feeling. While talking or chewing, the surgical mask drifts down below the nose forcing me the user to adjust and potentially contaminate the mask. In addition to the downward movement, the surgical masks can also creep up the user's face and into the eyes forcing another adjustment.

There are many stories of wearers developing allergic rashes from constant close contact with the used material of the mask. There have also been reports of wearers complaining of allergic reactions and rashes from the elastic material used for the straps. Also, fibers making up the surgical mask come lose from the structure and irritate users noses causing sneezes or scratching and readjustment, and potential contamination, or the mask. The constant use of the same mask, or a poorly purchased mask, can also leave the user with a helpless feeling when a mask strap breaks rendering the mask useless. Or, the elastic strap snapping and striking the user's face.

The shortage of surgical and not recommended use of N95 type masks, needed for medical staff, had some organizations encouraging the making and use of 100% cotton face masks. Many volunteers with the ability and means to sew made and donated these homemade masks. The problems with these cotton masks is that the elastic used to hold the mask in place, was in a shortage and the makers were forced to use cloth material instead. Because everyone's facial features vary in size, some masks were made in donated batches too small or to big and it could be said the same for the cloth straps. Using the cotton masks with too small of a strap put pressure on the back of the ears and caused annoying rashes and pain in the region. Wearing a surgical mask with the same condition causes the thin elastic to cut and slice into the back of the ear. Additionally, the 100% cotton masks material was heavier and thicker making it difficult to breathe.

Also, the process of applying the surgical, cotton or N95 type mask to be worn is difficult. Time spent grasping the front end of a N95 type mask and fumbling around with the lower and upper elastic straps to be set around the users head is awkward. Applying the cotton or surgical mask is even more tedious and difficult taking twice as long trying to install the elastic straps around the user's ears or tying the cotton straps in place and adjusting them for the maximum comfort allowed by the mask being used. For users with longer hair, the process can be even more difficult with the elastic straps becoming entangled in their long hair. This type of user can spend a great deal of time trying to detangle the knots of elastic and hair.

The relaxation of mask wearing rules as the vaccinations advanced, some areas are not wearing masks 100% of the time at work or socially. However, when required, users often find themselves fumbling around and scrambling for their mask and frantically putting them on when needed.

As a result of the Covid-19 virus, seasonal flu's, future diseases and the current enforcement of mask wearing, wearing masks on a daily basis may become more common. Therefore, there is a need for a half face mask worn by means of two (2) side temple holder arms, that is easy and quick to put on and wear comfortably for extended periods of time, overcoming the limitations of the prior art.

BRIEF DESCRIPTION OF THE DRAWINGS

These and other features, aspects and advantages of the present invention will become better understood with regard to the following description, appended claims, and accompanying figures where:

FIG. 700 is a front view of filter material useful for the quick fit mask of FIG. 000.

SUMMARY

Figure 0:
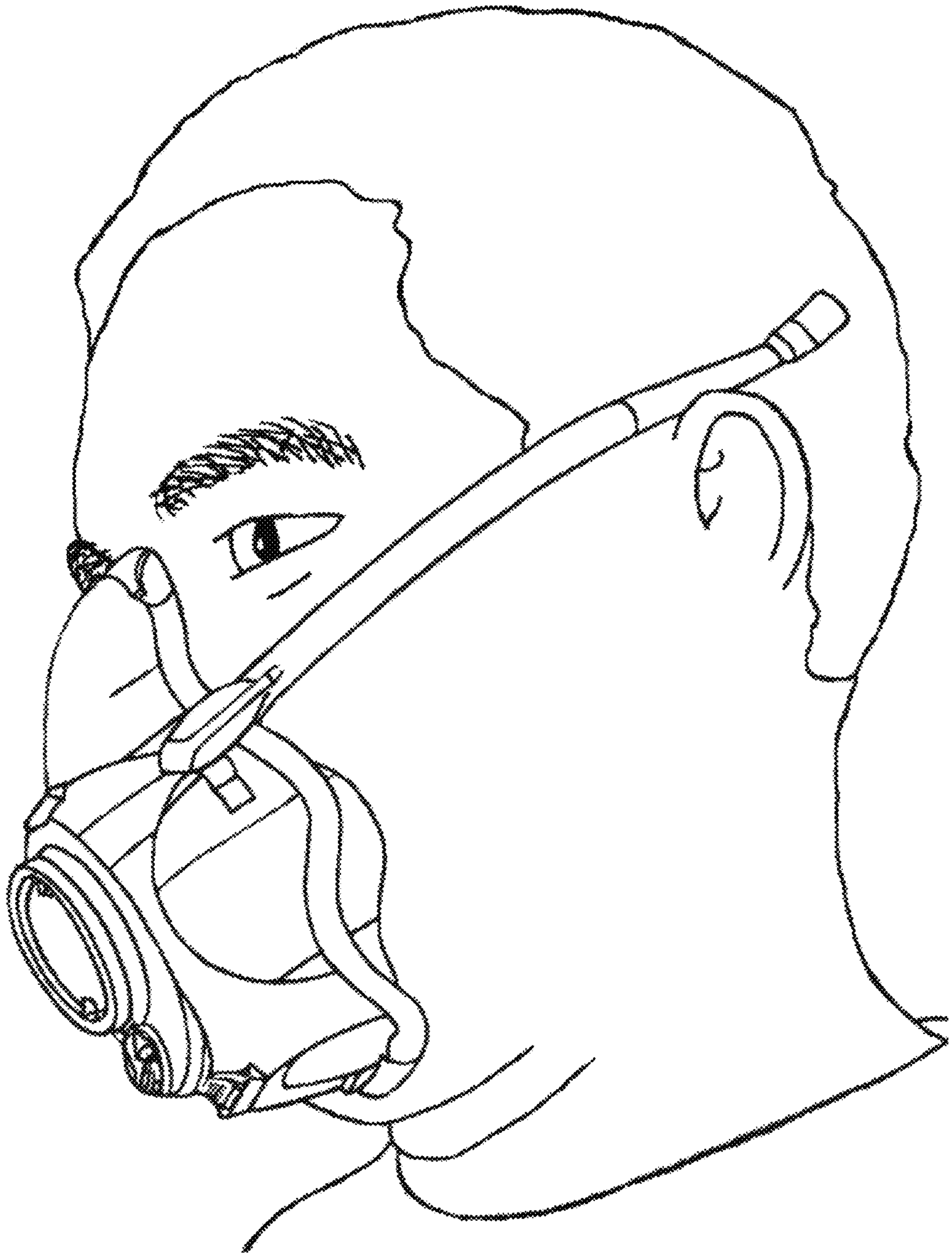
FIG. 000 is a perspective view of the quick fit mask of as worn by a user, using two side temple arms, that is easy and quick to put on and wear comfortably for extended periods of time, according to one embodiment.

A mask comprising a mask frame, a nose mount, a removable filter stand off support arm, a plurality of removable temple support arms, where each temple support arm has an attachment mechanism to easily attach or detach one or more of the temple support arms to or from the mask frame and temple tips attached to an anterior end of the temple support arms for comfort, a filter rim for attaching a filter to the interior, exterior or both the interior and exterior of the mask frame, and a plurality of removable filter clips for attaching the filter to the filter rim.

The mask further comprises a hemispherical cup attached to the mask frame; a top ring support attached to the hemispherical cup; and a top ring cap insert attachable to the hemispherical cup. The top ring cap insert comprises a logo, a cap shaft and a cap lock.

The mask further comprises one or more than one filter insert slot attached to the filter rim; one or more than one strap loops attached to the frame; and at least two temple backstops attached to the temple arms to support glasses.

The temple support arms further comprise temple logo insert holes to attach temple support arms to the frame, the logo plates have pins, insertable into the temple logo insert holes, to attach the temple support arms to the frame. The frame comprises one or more than one attachment mechanism that is selected from the group consisting of hinges, screw mount, snap-ins, push connection clips, a molded frame as one piece or twist-in to easily attach or detach one or more of the temple support arms to or from the mask frame.

The plurality of filter clips are selected from spring clips, Terry clips, snaps, Molle clips, crocodile, and any other known or unknown clip used to temporarily attach the filter to the mask frame. The filter also has a plurality of tabs to reinforce attachment points with the plurality of filter clips.

The mask is made from disposable material or from material that can be easily sanitized for multiple uses. The mask is made of a firm plastic, silicone formed from a mold, or 3D printed.

The filter is made from disposable material such as light cloth, cotton, paper, cardboard, surgical mask material, and HEPA filter material.

DETAILED DESCRIPTION OF THE INVENTION

The present invention overcomes the limitations of the prior art by providing a half face mask worn by means of two side temple holder arms, that is easy and quick to put on and wear comfortably for extended periods of time. The present invention can be put on quickly and easily as putting on a pair of sunglasses.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific details. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. The flowcharts and block diagrams in the figures can illustrate the architecture, functionality, and operation of possible implementations of systems, methods according to various embodiments disclosed. Although a flowchart may describe the operations as a sequential process, many of the operations can be performed in parallel or concurrently. In addition, the order of the operations may be rearranged. A process is terminated when its operations are completed. A process may correspond to a method, a function, a procedure, etc.

In the following description, certain terminology is used to describe certain features of one or more embodiments of the invention.

The term "clip" refers to circular spring clips or Terry clips for quickly and easily attaching a filter to a circular or tubular frame.

Various embodiments provide a mask. One embodiment of the present invention provides the mask. In another embodiment, there is provided a method for using the mask. The device and method will now be disclosed in detail.

Referring now to Fig. A, there is shown perspective view of the quick fit mask of as worn by a user, using two side temple arms, that is easy and quick to put on and wear comfortably for extended periods of time, according to one embodiment. Although the use of N95, cotton or surgical masks have their place, there is a need for an improved mask and method of wearing the improved mask. To be able to put on a N95 type, cotton, surgical, dust, or spray guard mask as easy as it is to put on a pair of sunglasses.

Research has shown that materials, such as HEPA Vacuum bags and filters would block out the oral or nasal spray of 0.5 micron particles from a wearer/user, as well as saliva type spray/fluids.

To remedy the issue with the surgical/cotton masks sitting and pressing to close to the face, the mask is formed to contour the human face from nose to chin with a hemispherical cup large enough for a personally fitted, user preferred material to be away from the face.

The mask is intended for a user to cut and fit their own preferred material and fit it in the hemispherical inner portion of the mask while being secured with provided clips, one upper clip to support and secure the top end of such filter and clips to the bottom portion of the mask to do the same. Although the mask is intended for users to use their own material, there are optional insert ports to fit a proprietary dust/spray filter.

In the future when you enter a local grocery store you could see clerks and staff wearing this mask with the logo of the super market. At a baseball game, everyone could be wearing the mask with their favorite team. The ease of use, with a momentarily pull down of the mask allows the wearer to quick drink or snack at his or her convenience. Walking down the streets of the city, you could see people walking with their personalized masks, sparkling from rhinestones dazzling in the sun. Coworkers can put on the mask with one swift motion ready to converse and talk about the business at hand. Riding a bus and you could look out the window seeing children playing, wearing a mask with the cap of the mask formed in the shape of their recognizable, favorite super hero. School is in session and your child is asking if you know where their red mask is to match the red shirt they are wearing. From movie theaters, concerts to entertainment venues, selling masks with the current performer's design/logo/name. The trend for mask wearing now and in our foreseeable future with fun custom upbeat style.

Figure 100:
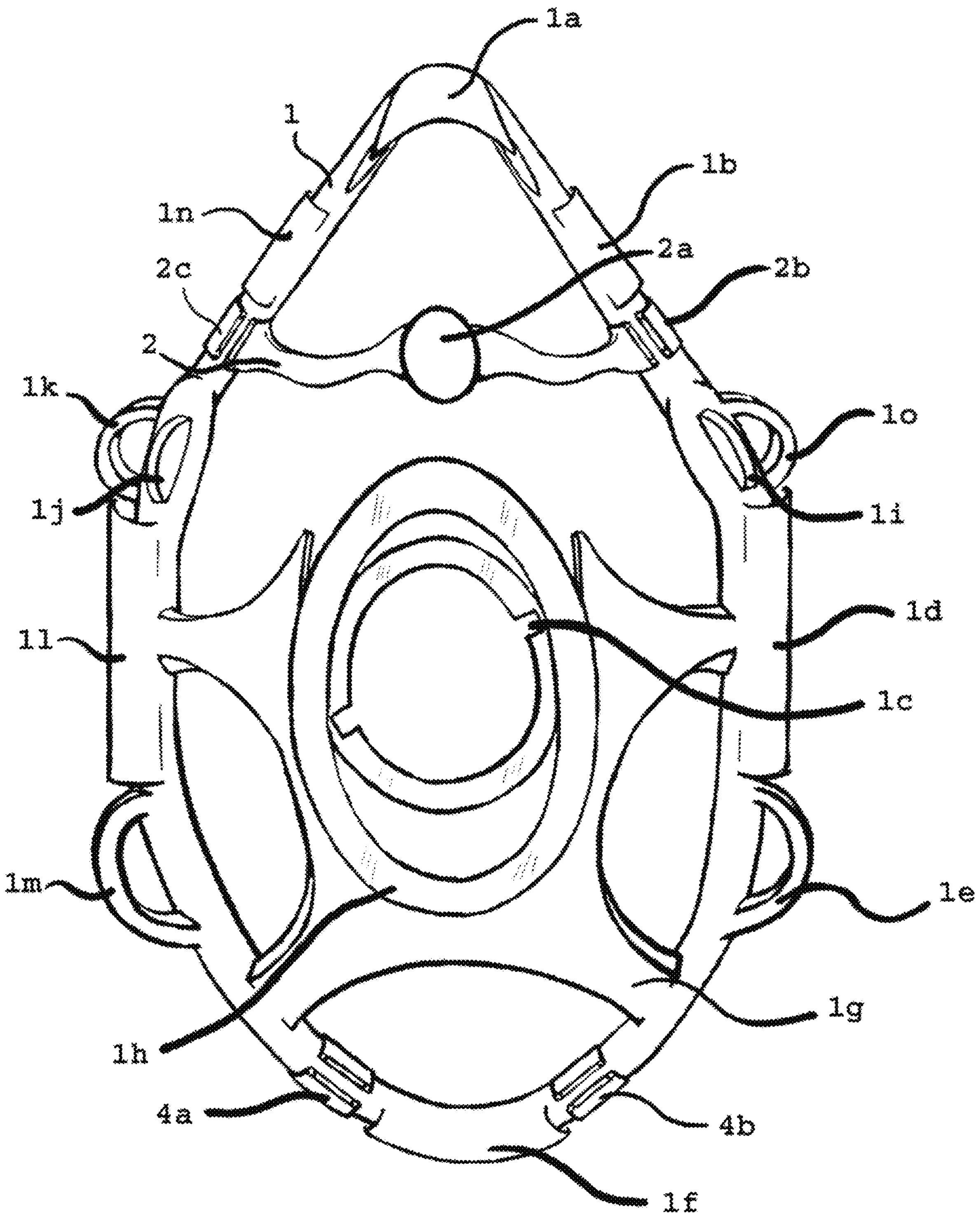
FIG. 100 is a front view of a quick fit mask of FIG. 000 without temple arms.

Referring now to FIG. 100, there is shown a front view of a quick fit mask of Fig. A without temple arms 3 and 31. The quick fit mask 100 comprises:

a) a nose mount 1*a;*
b) an upper left filter insert slot 1*b;*
c) a top ring logo cap insert 1*c;*
d) a top ring logo cap insert 1*d;*
e) a lower left filter insert 1*e;*
f) a lower left strap loop 1*f;*
g) a lower left filter insert slot 1g*;*
h) a hemispherical cup 1*h;*
i) a top ring support 1*i;*
j) a left temple backstop 1*j;*
k) a right temple backstop 1K;
l) an upper right strap loop 1*l;*
m) a lower right filter insert slot 1*m;* and
n) a lower right strap loop1*n.*

The mask 100 comprises a frame 1 having a left receptacle 1*i* and a right receptacle 1*j* configured to receive the first temple arm 3 and the second temple arm 3*a,* for attaching the first and second temple arms 3 and 3*a* to the frame 1. The corresponding portion to attach the temple arm 3 and 3*a* to the frame 1, may be, for example, but not limited to an insertable, a clip-on, a snap-in, a twist-on, a hinge type, and a solid "U" shaped, attached to the mask as one piece, latching type mechanism device that is used to connect the left and right temple arms 3 and 3*a* to the mask 100.

The mask 100 is to be worn over the nose/mouth/chin, and worn like sunglasses with the use of temple arms 3 and 3. The nose mount 1*a* comprises is flattened and curved to fit over the nose to compliment users that wear glasses. The center/top portion 500 of the mask is intended to be used to fit an insert cap with any given/permitted/licensed logo or design formed or created on the top portion of the cap.

The frame 1 also comprises temple backstops 1*i* and 1*j* to provide resistance to prevent the temple arms 3 and 3*a* from moving out away from the users head. The frame 1 located close to the user's face has insert sections for attaching The mask 100 is equipped with a plurality of strap loops 1*e,* 1*k,* 1*m* and 1*o* for the use of an optional strap to help secure the mask 100 to the users face without slippage.

The frame 1 can be made of a firm plastic or silicone formed from a mold, or 3D printed in various pieces to be assembled or as a complete unit as shown in Fig. A, without the filter 7. The hemispherical cup 1*g* can be sized for the individual user. The hemispherical cup 1*g* the provides clearance from the users nose and mouth, enabling the user to breath easier. In one embodiment, the hemispherical cup 1*g* attaches to the mask frame 1 by four support branches. At the top of the hemispherical cup 1*g* is a top ring logo cap insert 1*c* with two latch grooves 1*c* for inserting a logo cap 5 that can have a design or logo. The logo cap 5 is interchangeable between like size masks by inserting the bottom of the logo cap 5 into the top ring logo cap insert 1*c* and locking in place with a quarter turn.

The mask frame 1 in one embodiment is a tubular base that contacts the human face and is contoured to fit from and around the bridge of the users nose to the lower chin region to cover the nose and mouth. A nose mount 1*a* at the top portion of the frame, is flattened and fitted up and over the user's nose to allow wearing glasses while using the mask 100. Filter insert slots 1*b,* 1*d,* 1*f,* 1*l* and 1*n* are located at the bottom and the lower portion sides, and on the upper portion of each side of the frame 1 to fully insert the filter 7. A plurality of strap loops 1*e,* 1*k,* 1*m* and 1*o* on each upper and lower side of the frame 1 are used for attaching an optional strap to assist the user in keeping the mask 1 secured to the user's face. Temple backstops 1*i* and 1*j* above each upper left and right strap loops 1*k* and 1*o.* are flat, half circle plates meant to act as supports to prevent the temple arm structure from being forced outward away from the user's head.

The upper left and right filter insert slots 1*c,* 1*f,* 1*l* and 1*n* provide attachment points for the filter 7 with filter clips 2, 2*a,* 2*b* and 2*c.* top ring logo cap insert 1*d.* lower left filter insert. 1*e.* lower left strap loop. 1*f.* lower left filter insert slot. 1*g.* hemispherical cup. 1*h.* top ring support. 1*i.* left temple backstop. 1*j.* right temple backstop. 1*k.* upper right strap loop . 1*l.* lower right filter insert slot. 1*m.* lower right strap loop. 1*n.* upper right filter insert. 1*o.* upper left strap loop. 2. left branch top personal filter nose clip support.

Figure 200:
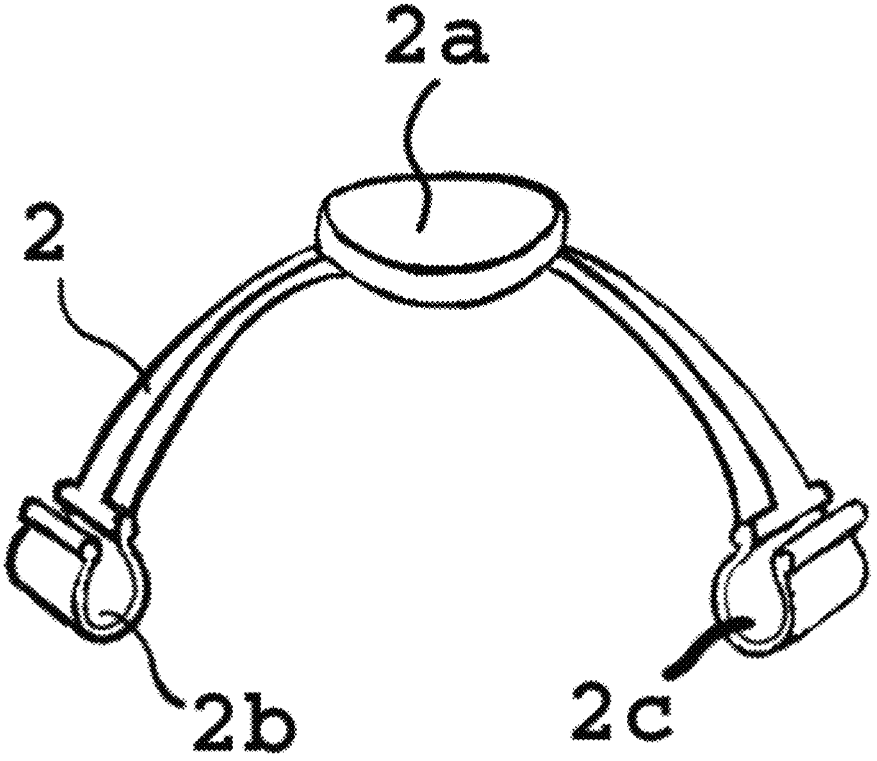
FIG. 200 is a close up view of a filter stand off support arm of the quick fit mask of FIG. 000.

Referring now to FIG. 200, there is shown a close up view of a filter stand off support arm 2 of the quick fit mask 1. The filter stand off support arm 2 forms an arch structure to keep the filter 7 off of the user's nose and face. A filter stand off support 2*a* is attached to the filter stand off support arm 2 to further assist in keeping the filter 7 away from the user's face without slipping up or down as is common with most current masks available on the market. The filter stand off support arm 2 also comprises a plurality of filter stand off support arm clips 2*b* and 2*c* to attach the filter stand off support arm 2 to the frame 1. The filter stand off support arm clips 2*b* and 2*c* can also be used to help secure the filter 7 in place.

Figure 300:
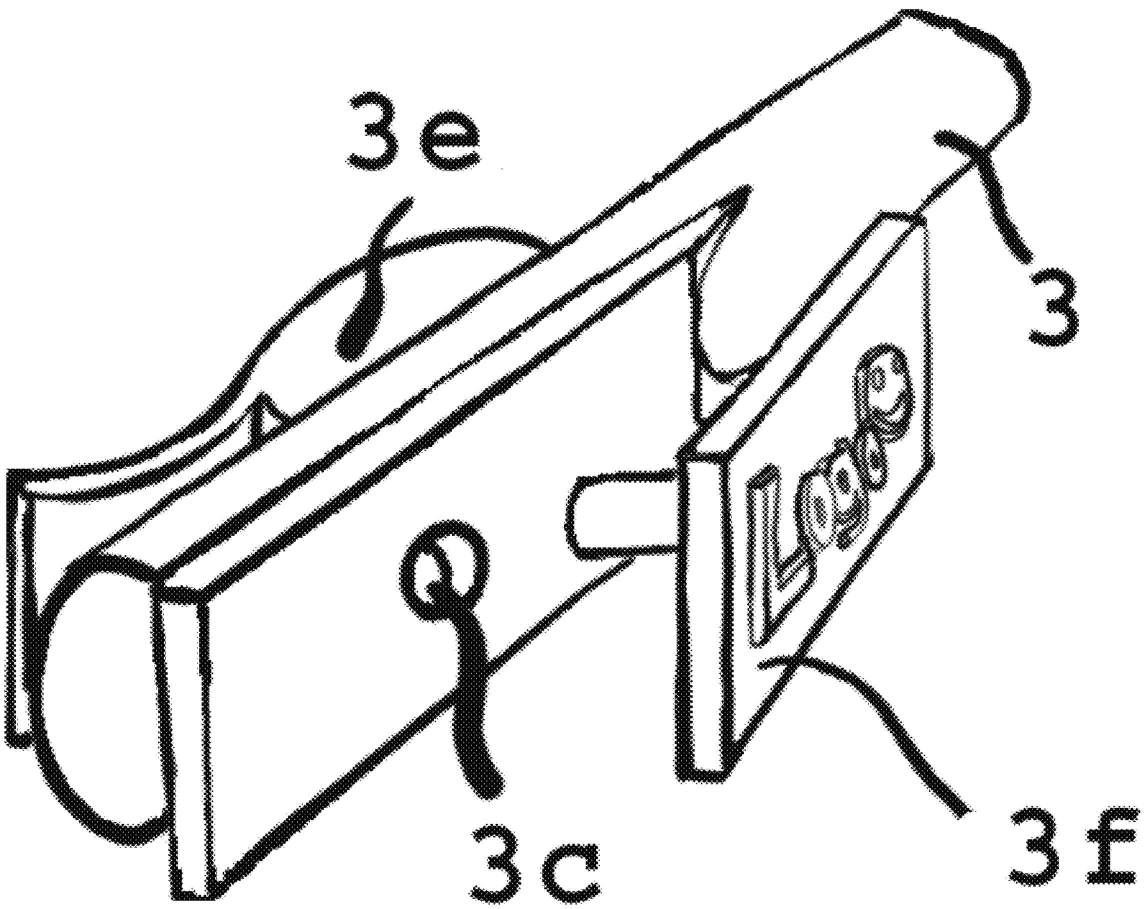
FIG. 300 is a close up view of a temple support of the quick fit mask of FIG. 000.

Referring now to FIG. 300, there is shown a close up view of a temple arm support 3 of the quick fit mask. Temple support arms 3 and 3*a* are located on each side of the frame 1 and are made to secure the mask 100 in place on the user's head, like sunglasses. The temple support arms 3 and 3*a* attach securely to the lower base of the frame 1 using a simple clip push in style fitting in this embodiment. As will be understood by those with skill in the are, this structure is not meant to be limiting and other configurations can be used to quickly attache the temple support arms 3 and 3*a* to the frame 1, such as, for example, hinges, screw mounts, snap-ins, molded to frame as one piece, twist-in or any other means for securing the temple support arms 3 and 3*a* to the mask 100. The length of temple support arms 3 and 3*a,* is not limited and can wrap around the user's head.

What is shown in FIG. 300 is an enhanced view the left temple connection area, where the opposite side is identical to the one shown and described herein. The connection to the frame 1 comprises a push clip 3*e* with a quick release push button, a logo insert hole 3*c* and a logo plate 3*f.* The logo plate 3*f* can comprise a logo, design or other decoration. The logo plate comprises a locking pin that fits inside the logo insert hole and through the temple support arm 3. Once engaged by the push clip 3*e,* the locking pin attached to the logo plate 3*f* secures the temple support arm 3 in place, essentially locking the temple support arm 3 into position on the mask 100.

Figure 400:
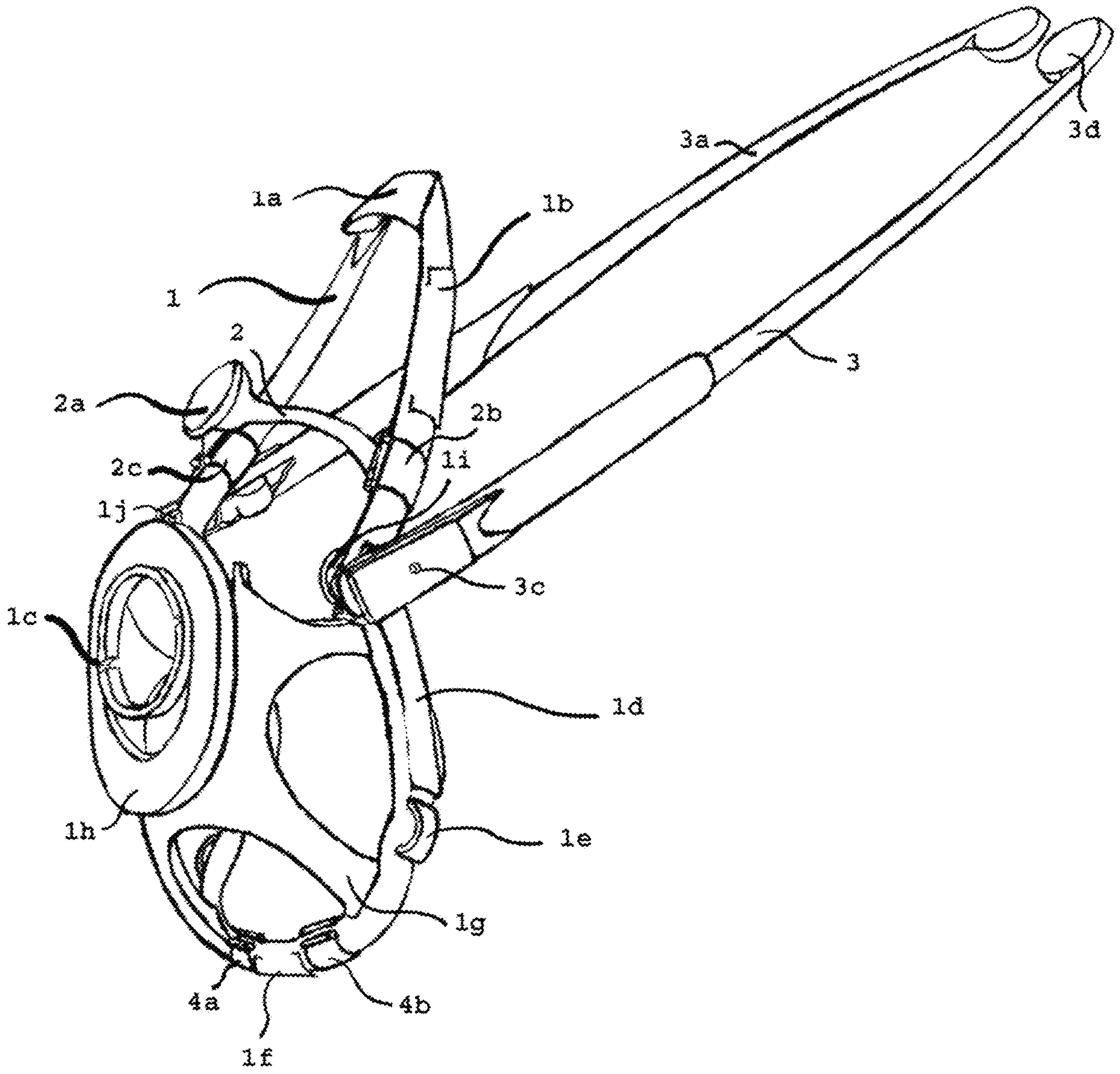
FIG. 400 is a perspective view of the quick fit mask of FIG. 000.

Referring now to FIG. 400, there is shown a perspective view of the quick fit mask 100. In this embodiment, a lower right personal filter clip 4*a* and a lower left personal filter clip 4*b* are shown. Each of the personal filter clips 4*a* and 4*b* are used to attach the filter 7 to the frame 1 along with the filter stand off support arm clips 2*b* and 2*c*.

Figure 500:
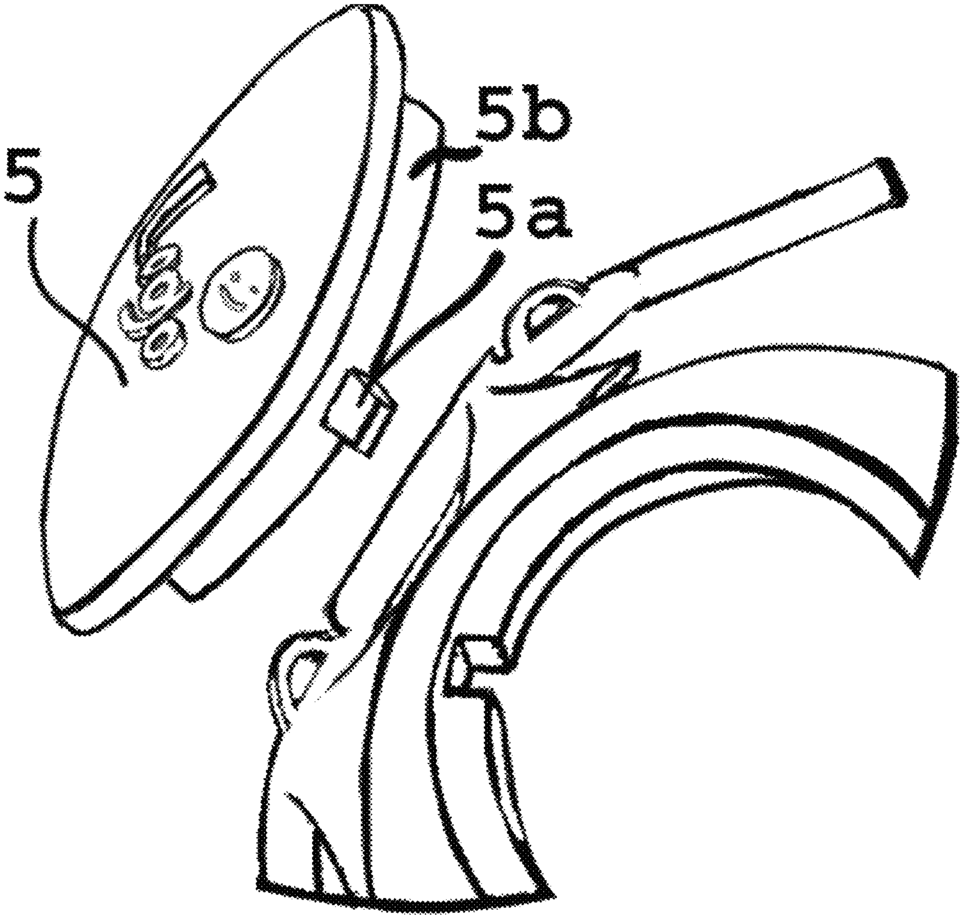
FIG. 500 is a close up view of a logo cap of the quick fit mask of FIG. 000.

Referring now to FIG. 500, there is shown a close up view of a logo cap 5 of the quick fit mask 100. The logo cap 5 comprises a cap shaft 5*b* and a cap lock 5*a* to secure the logo cap 5 onto the mask 100. The logo cap. 5 is replaceable and can be used for advertisement of the manufacturer's brand, or as an identification, or just for decoration. The length of cap shaft 5*b* is sufficient to provide a snug fit within the logo cap insert 1*c*. The cap lock 5*a* is also sized to fit in the grooves in the logo cap insert 1*c* for securing the logo cap. 5 in place.

Figure 600:
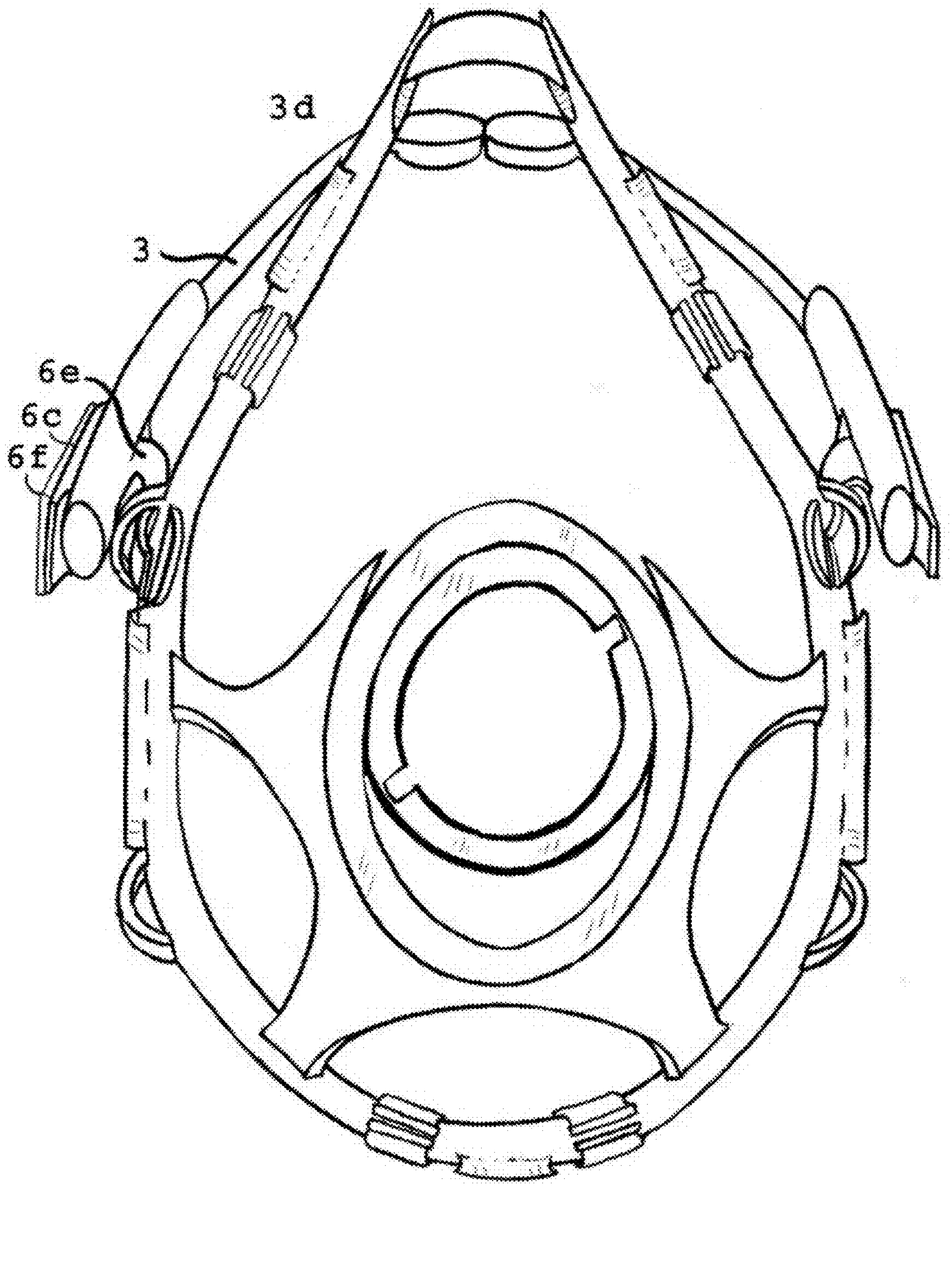
FIG. 600 is a front view of the quick fit mask of FIG. 000 with temple arms.

Referring now to FIG. 600, there is shown a front view of the quick fit mask with temple arms. As can be seen, this is the identical, but opposite side of close up view of FIG. 300. It comprises the temple arm 3, a right temple logo insert hole 6*c,* a right temple push connection clip 6*e* and aright temple logo plate with insert pin on back 6*f*. The operation of the right side is exactly as described above. The option of attachable temple arms 3 and 3*a* provide the user with a level of customization and comfort that isn't found in any other masks on the market today. User's with different lengths from the front of their face to the back of their ears can attach the correct size arms temple arms 3 and 3*a* for maximum comfort for extended wearing times.

Referring now to FIG. 700, there is shown a front view of filter material useful for the quick fit mask 100. The filter 7 can be made form material, such as, for example, light cloth, cotton, paper, cardboard, surgical mask material, HEPA filter material, etc. The filter 7 is shaped to fit outside the hemispherical cup 1*g* and over the bottom of the frame 1 using filter tabs 7*a,* 7*b,* 7*c,* 7*d* and 7*f* affixed to the filter rim 7*e* to attach the filter 7 to coincident filter insert slots 1*b,* 1*d,* 1*f,* 1*l* and 1*n* n on the frame 1.

In another embodiment, the filter 7 is made from a proprietary filter material. This makes the present invention useful for other types of work environments that do not require an enclosed mask, such as a carpentry shop where there is a lot of dust. The replaceable filter 7 reduces the costs because only the filter 7 needs to be disposed. Any broken part of the mask 100 or the filter are easily replaced at a minimum cost.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. A mask comprising:

a) a mask frame;

b) a nose mount attached to the mask frame;

c) a filter stand off support arm removably attached to the mask frame;

d) a plurality of temple support arms removably attached to the mask frame, wherein the frame comprises one or more than one attachment mechanism to easily attach or detach one or more of the temple support arms to or from the mask frame;

e) a filter rim attached to the mask frame for attaching a filter to the interior, exterior or both the interior and exterior of the mask frame; and f) a plurality of filter clips removably attached to the filter rim for attaching the filter to the filter rim.

2. The mask of claim 1, further comprising:

a) one or more than one filter insert slot attached to the filter rim;

b) one or more than one strap loops attached to the frame; and c) at least two temple backstops attached to the pluarlity of temple arms to support glasses.

3. The mask of claim 2, wherein the pluarlity of temple support arms further comprise temple logo insert holes to attach temple support arms to the frame.

4. The mask of claim 3, wherein the plurality of temple support arms further comprise logo plates with pins into the temple logo insert holes that are removably attached to the temple support arms.

5. The mask of claim 4, wherein the frame comprises an attachment mechanism is selected from the group consisting of: hinges, screw mount, snap-ins, push connection clips, a molded frame as one piece or twist-in.

6. The mask of claim 1, further comprising:

a) a hemispherical cup attached to the mask frame;

b) a top ring support attached to the hemispherical cup; and c) a top ring cap insert attachable to the hemispherical cup.

7. The mask of claim 6, wherein the top ring cap insert comprises a logo, a cap shaft and a cap lock.

8. The mask of claim 1, wherein the mask is made from a disposable material.

9. The mask of claim 8, wherein the filter is made from the group consisting of:

light cloth, cotton, paper, cardboard, surgical mask material, and HEPA filter material.

10. The mask of claim 1, wherein the plurality of temple support arms further comprise temple tips attached to an anterior end of the temple support arms for comfort.

11. The mask of claim 1, wherein the plurality of filter clips are selected from the group consisting of: spring clips, Terry clips, snaps, Molle clips, and crocodile.

12. The mask of claim 1, wherein the frame comprises one or more than one attachment mechanism that is selected from the group consisting hinges, screw mount, snap-ins, push connection clips, and a molded frame as one piece or twist-in.

13. The mask of claim 1, wherein the filter comprises a plurality of tabs to reinforce attachment points with the plurality of filter clips.

14. The mask of claim 1, wherein the mask is made from a material that can be easily sanitized for multiple uses.

15. The mask of claim 1, wherein the mask is made of a firm plastic, silicone formed from a mold, or 3D printed.

16. The mask of claim 1, wherein the filter is made from a disposable material.

* * * * *